United States Patent [19]

Dalrymple

[11] 4,446,958
[45] May 8, 1984

[54] CROSS-PIT CONVEYOR

[75] Inventor: Thomas H. Dalrymple, Marion, Ohio

[73] Assignee: Dresser Industries, Inc., Dallas, Tex.

[21] Appl. No.: 321,862

[22] Filed: Nov. 16, 1981

[51] Int. Cl.³ .............................................. B65G 47/18
[52] U.S. Cl. .................... 198/311; 198/314; 198/586
[58] Field of Search .............. 198/317, 318, 319, 320, 198/586, 311, 314, 508, 589, 304, 313, 592; 299/18; 414/133

[56] References Cited

U.S. PATENT DOCUMENTS

| | | | |
|---|---|---|---|
| Re. 29,110 | 1/1977 | Oury | 198/314 |
| 591,047 | 10/1897 | Hoover | 299/18 |
| 733,824 | 7/1903 | Dueringer | 198/314 |
| 779,139 | 1/1905 | Spence | 198/309 |
| 895,586 | 8/1908 | Pugh | 299/67 |
| 1,006,790 | 10/1911 | Reinbold | 198/309 |
| 1,179,320 | 4/1916 | Jackson et al. | 198/309 |
| 1,821,881 | 9/1931 | Coppock | 198/311 |
| 1,833,192 | 11/1931 | Waterman, Jr. | 198/314 |
| 1,896,587 | 2/1933 | Lambert | 198/309 |
| 3,037,612 | 6/1962 | Matheson et al. | 198/314 |
| 3,185,290 | 5/1965 | Dietrich | 198/863 |
| 3,413,035 | 11/1968 | Lockwood | 299/64 |
| 3,444,987 | 5/1969 | Palmer | 198/301 |
| 3,687,276 | 8/1972 | Pelletier | 198/233 |
| 3,744,615 | 7/1973 | Plaquet et al. | 198/309 |
| 3,826,353 | 7/1974 | Greasley | 198/314 |
| 3,878,935 | 4/1975 | Oury | 198/863 |
| 3,992,060 | 11/1976 | Bargel et al. | 299/67 |
| 4,058,198 | 11/1977 | O'Neill et al. | 198/314 |
| 4,172,518 | 10/1979 | Grayson | 198/631 |
| 4,245,732 | 1/1981 | Couperus | 198/318 |
| 4,290,651 | 9/1981 | Files et al. | 299/7 |

FOREIGN PATENT DOCUMENTS

| | | | |
|---|---|---|---|
| 39874 | 6/1965 | German Democratic Rep. | 198/320 |
| 304228 | 3/1972 | U.S.S.R. | 198/314 |

*Primary Examiner*—Joseph E. Valenza
*Assistant Examiner*—Kyle E. Shane
*Attorney, Agent, or Firm*—J. M. Lorenzen; John N. Hazelwood

[57] ABSTRACT

An improved cross-pit conveyor is provided for transferring excavated topsoils from the working side across the pit to the reclamation side in a strip mining operation. The machine includes a base to be positioned on the working side, a slewable upper frame mounted on the base, a long cantilevered conveyor pivotably supported at one end by the upper frame and reaching across the pit, and a separate on-board auxiliary conveyor for initially receiving the excavated material and feeding it smoothly onto the cantilevered conveyor. The receiving end of the auxiliary conveyor is pivotably connected to the back of the upper frame, and the discharging end is floatingly supported on the receiving end of the main conveyor to maintain a constant cooperative association therewith regardless of the hoist angle of the main conveyor.

9 Claims, 7 Drawing Figures

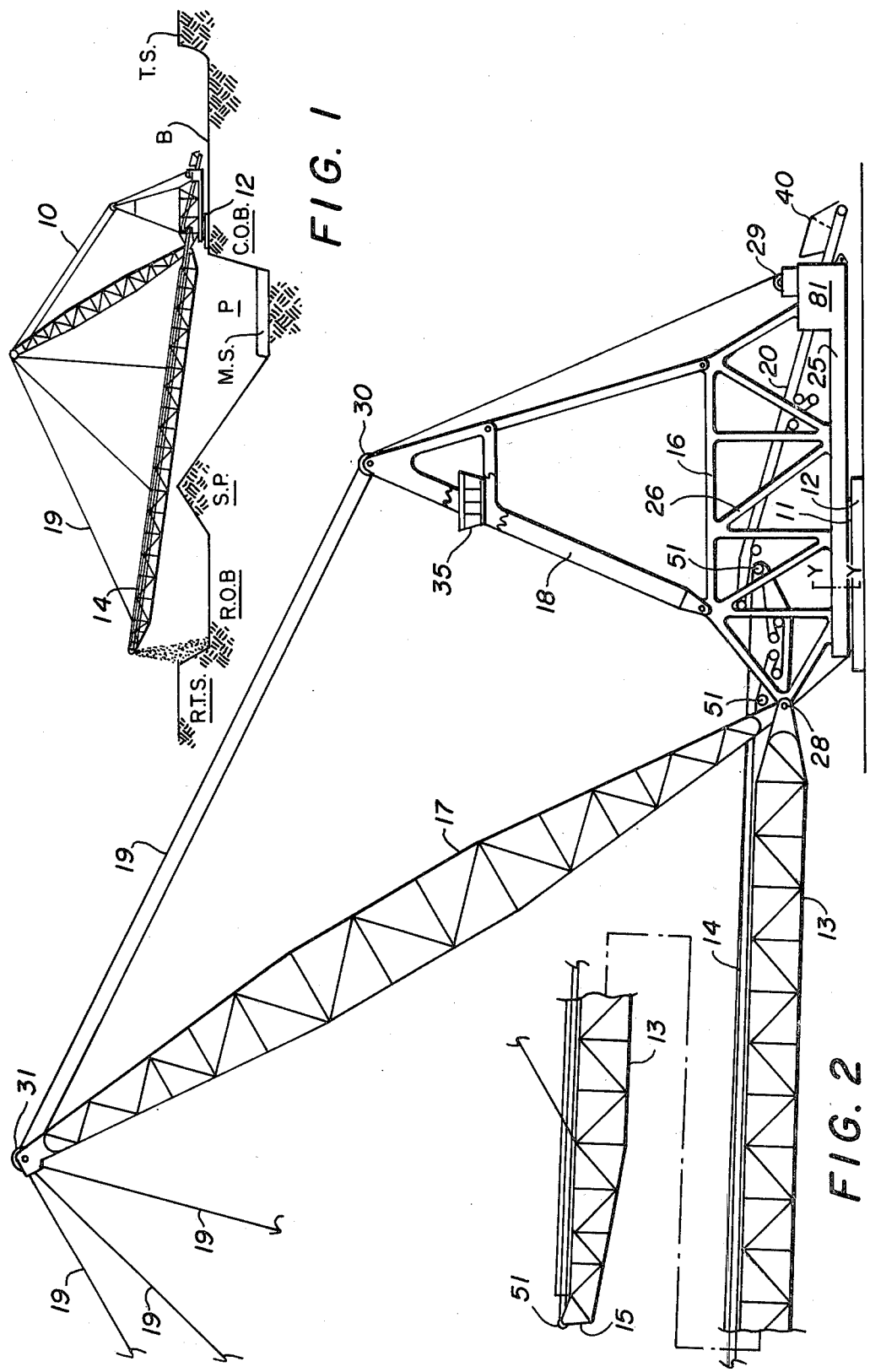

CROSS-PIT CONVEYOR

The present invention relates to cross-pit conveyors for use in strip mining operations, and more particularly to such a machine having a separate receiving and loading conveyor in cooperative association with the long cantilevered main conveyor.

As used herein the term "cross-pit conveyor" refers to a new breed of machines for use in strip mining operations in which the overburden materials are removed to expose the mineral seam along an elongated pit. Such a machine, of which a general description is found in U.S. Pat. No. 4,290,651, comprises: a base intended for positioning on the highwall side of the mine pit; an upper frame rotatably mounted on the base; and a long cantilevered conveyor supported at one end by the rotatable upper frame. The cantilevered conveyor is long enough to carry excavated material from the working bench on the highwall side of the pit over and across the pit and nearest spoil piles and discharge it in the reclamation area. The free or discharge end of the cantilevered conveyor is supported by wire ropes extending from a mast and/or gantry above the upper frame. The conveyor is preferably pivotably connected to the upper frame such that it can be hoisted to various angles above the horizontal.

The cross-pit conveyor is a relatively new machine concept and its current popularity is largely attributable to modern land reclamation laws and practices for strip mining operations. Modern reclamation requires the separate handling of the topsoil and subsoil layers and the redepositing of them in generally their natural geologic order. Using a cross-pit conveyor to transfer such segregated material directly over and across the long pit avoids the extra expense and equipment congestion of other systems. Furthermore, since the cantilevered conveyor can be swung horizontally, it can discharge its payload in gradual windrows to reduce the amount of final grading necessary to complete the reclamation of the land.

In most mining schemes, such as that described in co-pending application, Ser. No. 321,863, the cross-pit conveyor is intended for use in association with an excavator for digging the selected soil and some means, such as a mobile belt wagon, for transferring the excavated soil to the cross-pit conveyor. To provide flexibility and accommodate the different operating movements of the associated equipment, it is desirable for the cross-pit conveyor machine to include a separate, on-board receiving and feeding conveyor. This auxiliary conveyor receives the excavated material initially and controllably feeds it onto the long main conveyor.

The matching of the auxiliary conveyor to the main conveyor involves special considerations. It is very important to insure a smooth steady flow of the material from the auxiliary conveyor onto the main conveyor to eliminate or minimize surge loads, high impact forces and abrasion of the main conveyor belt. It is also desirable that the main conveyor can be hoistable to different inclinations without significantly effecting the material transfer between the two conveyors or the cooperative association between the auxiliary conveyor and other equipment.

Therefore, it is the principal object of the present invention to provide a cross-pit conveyor machine having an auxiliary on-board conveyor for initially receiving excavated material and subsequently transferring it smoothly onto the main conveyor, which auxiliary conveyor is mounted and arranged cooperatively with the main conveyor in such a manner that the controlled transfer of material onto the main conveyor is not adversely affected by change in the hoist angle of the main conveyor.

This is achieved by a cross-pit conveyor embodying the present invention which comprises: a base; an upper frame rotatably mounted on the base; a long cantilevered conveyor pivotably mounted at one end to the upper frame and extending outwardly therefrom; and an auxiliary conveyor also pivotably mounted on the upper frame with its discharging end floatingly supported on the inboard receiving end of the cantilevered conveyor.

The main conveyor is pivotally connected to the front end of the frame and its remote discharge end is supported by hoistable wire ropes. The tail or receiving end of the main conveyor extends slightly rearward into the upper frame. The auxiliary conveyor is pivotably connected to the rear end of the frame and extends forwardly and upwardly therethrough to a discharge end overlapping and floatingly resting on the tail end of the main conveyor. Because of this arrangement the drop distance for excavated material transferring from the auxiliary to the main conveyor remains minimal and substantially constant regardless of how steeply the main conveyor is inclined. Further, the tail or receiving end of the auxiliary conveyor, which may extend somewhat rearward of the upper frame, maintains a nearly constant elevation for the equipment feeding material to it.

In the preferred embodiment of the invention both the main and auxiliary conveyor are endless belt types. Because the auxiliary conveyor is independently driven, it can be operated at a separately controlled speed to project the payload material forward to land on the main conveyor at substantially the surface speed of the main conveyor belt. This important feature reduces abrasion of the main conveyor belt (which is long, expensive and costly to have down for repair) which would result if the transferring excavated material had to be accelerated by it. This same feature also minimizes any shock loading of the main conveyor belt.

These and other features of the invention will be apparent from the more detailed description of the invention which follows with reference to the accompanying drawings, which form part of this disclosure, and of which:

FIG. 1 is a general side elevation of a cross-pit conveyor embodying the present invention shown in perspective relative to a typical strip mining pit;

FIG. 2 is an enlarged side elevation of the machine of FIG. 1;

Referring first to FIG. 1, a cross-pit conveyor embodying the invention is designated generally by the numeral 10. It is shown here in its working position relative to a typical strip mine. In such a mine the mineral seam M.S. to be recovered is exposed along the bottom of a long narrow pit P formed by removing the topsoil T.S. and consolidated overburden C.O.B. from the highwall side of the mine and depositing them on the land reclamation side. After the mine has been initially developed it will appear in cross-section as shown in FIG. 1. The upper layer of topsoil T.S., which is meant to include the various layers of unconsolidated overburden, is stripped back on the highwall side to form the working bench B. In a previous pass the consolidated overburden C.O.B. from the present pit P has been dumped along a previously mined out pit to form the spoil pile S.P.. Beyond the spoil pile S.P., the area of previously leveled relocated oveburden R.O.B. will subsequently be covered with relocated topsoils R.T.S. to complete the land reclamation.

The principal function of the cross-pit conveyor 10 is to transfer the topsoil materials as they are excavated directly over and across the pit P and spoil pile S.P. and to deposit them on the relocated overburden R.P.B.. As shown, the base 12 of the cross-pit conveyor is positioned on the bench B and the long cantilevered main conveyor 14 must reach across the pit P and spoil pile S.P.. By way of example, the conveyor 14 will be approximately 600 to 650 feet lopng for a typical strip mine. A separate excavator, not shown, is used to dig the topsoils and feed them to the cross-pit conveyor while still another excavator, such as a dragline, is used to excavate and transfer the consolidated overburden.

Figure 3:
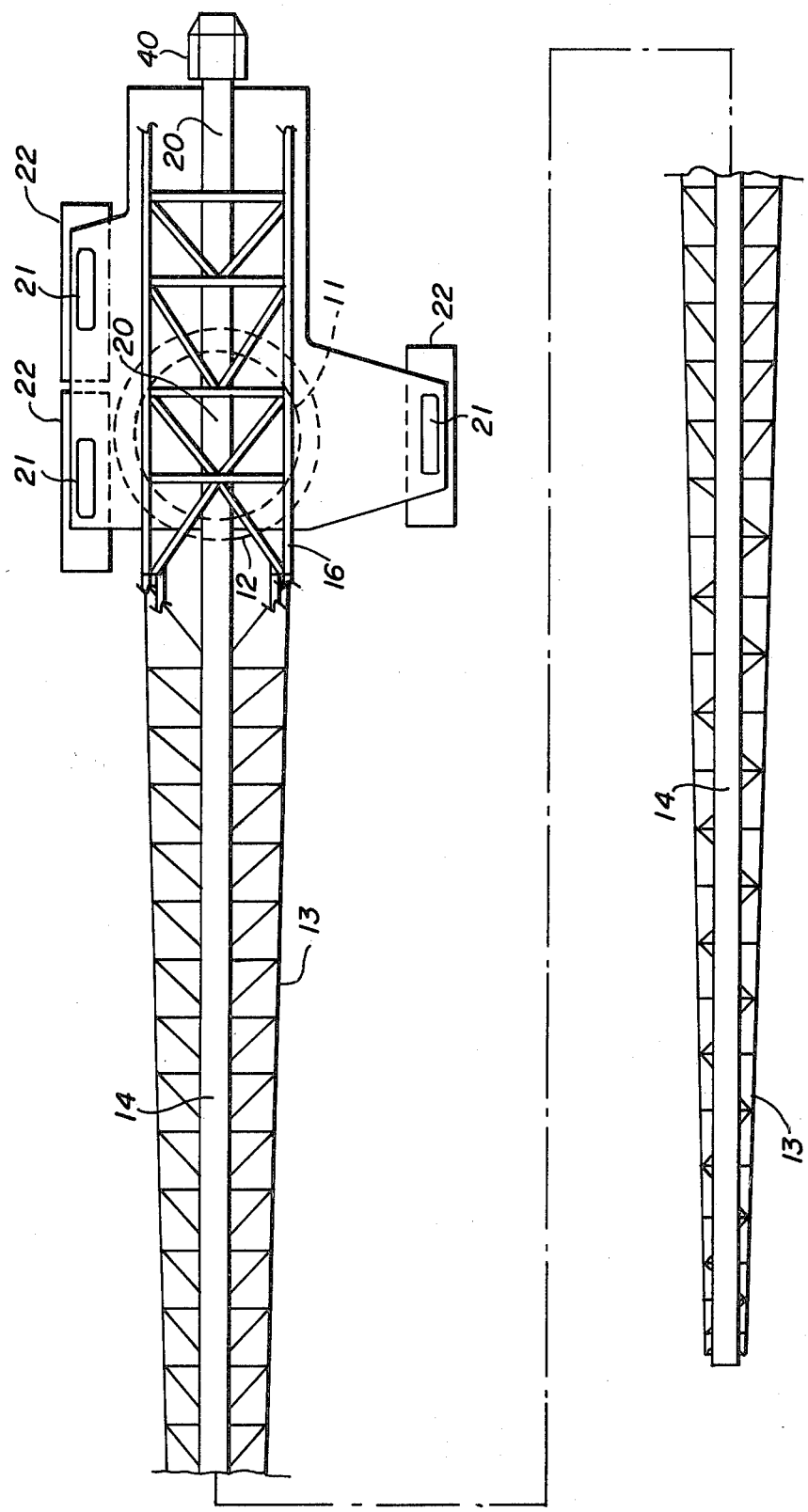
FIG. 3 is a top plan view of the machine of FIG. 2.

Referring now primarily to FIGS. 2 and 3, the general structure of the cross-pit conveyor 10 comprises a base 12, an upper frame 16 rotatably mounted on the base, a long cantilevered boom 13 pivotably connected to the front end of the upper frame 16 and supporting the long main conveyor 14, a mast 17 and gantry 18 extending upwardly from the frame 16 for support of the remote free end 15 of the boom 13 via the support ropes 19, and an auxiliary conveyor 20 supported on the upper frame and used to receive excavated material from an excavator and feed it onto the main conveyor 14.

The base 12 is a large diameter tub designed to distribute the weight of the machine 10 over as large an area of the bench as resonably feasible. Between the base 12 and the upper frame 16 is a roller circle 11 which enables the upper frame to rotate in a generally horizontal plane.

Figure 5:
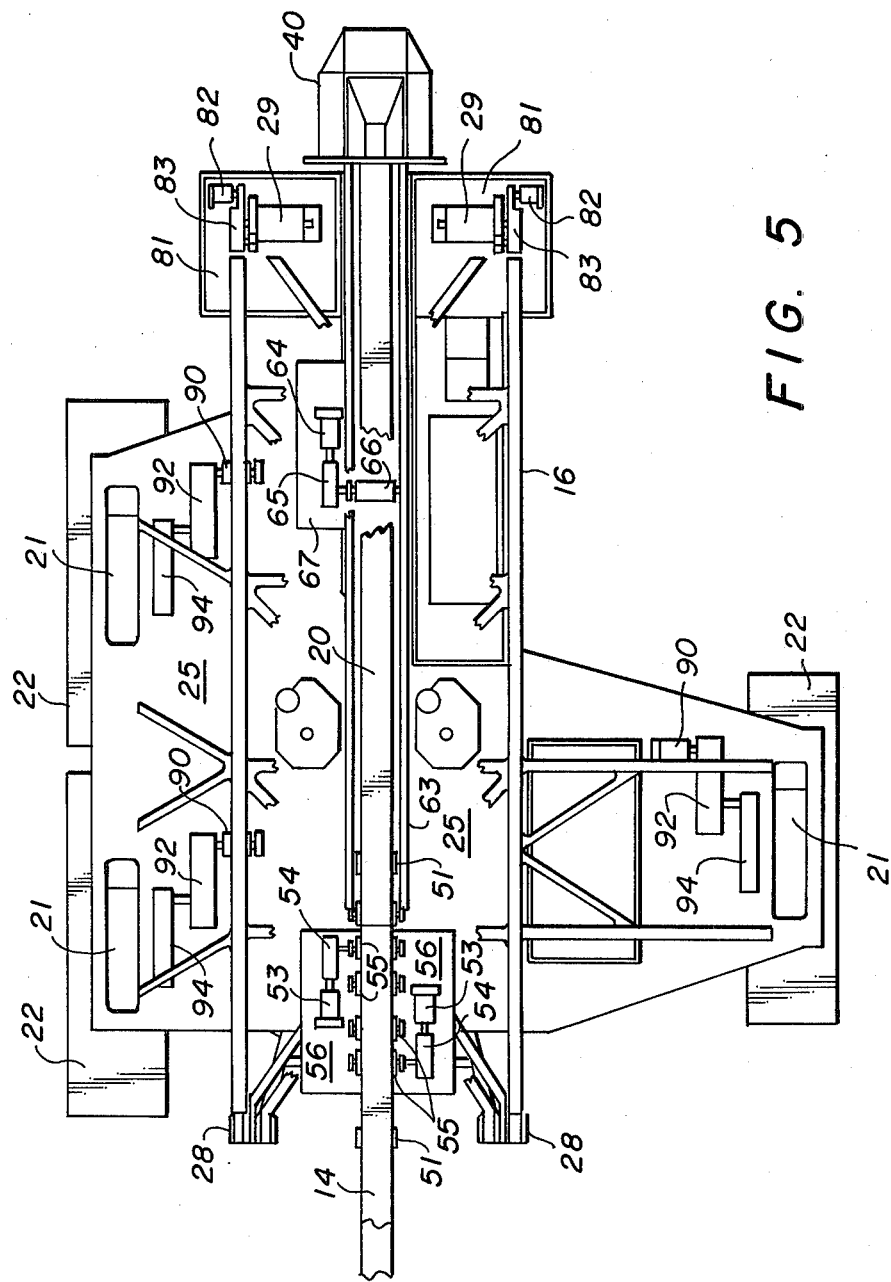
FIG. 5 is an enlarged plan view of that portion of the machine of FIGS. 1-3 shown in FIG. 4.

To make the macine 10 mobile, a set of eccentrically driven walking mechanisms, indicated generally at 21, including the grounding engaging shoes 22, are supported from the upper frame. In operation the walking mechanisms move the shoes 22 downward to lift the entire machine, including the base, off the bench and then in an elliptical path to advance the machine in a direction parallel to the long boom. Each of the walking mechanisms 21 is operated by a separate motor 90, speed reducer 92, and eccentric crank arm 94 which are shown schematically in FIG. 5. A more detailed explanation of a typical walking mechanism and its operation can be found in U.S. Pat. No. 3,500,945, and the three-point arrangement of walking mechanisms shown in FIG. 3 is more fully discussed in co-pending application Ser. No. 321,864.

The upper frame 16 comprises a base 25 and a truss-like structure 26 having a designated front end in the direction of the main conveyor and an opposite back end. The back end of the frame extends substantially farther from the axis Y—Y of the roller circle than does the front end at least partially to counterbalance the large moment of the long boom 13 and main conveyor 14. The long boom 13 is hingedly connected to the front end of the upper frame at 28 such that it can be pivoted in a vertical plane to adjust the inclination or hoist angle of the main conveyor 14. The hoisting of the boom 13 is accomplished by a pair of hoist drums 29 mounted on platforms 81 at the back of the upper frame 16. The hoist drums are driven respectively by drive assemblies comprising a motor 82 and speed reducer 83. The drums 29 retract and pay-out the hoistable support ropes 19 which pass over pulleys 30 and 31 at the top of the gantry 18 and mast 17 respectively and attach to the boom 13 at its distal end 15.

An operator's cabin 35 is located high up on the gantry 18 to give him panoramic visibility.

While the main conveyor 14 extends principally the length of the boom 13, the rear or receiving end of it extends partially back into the upper frame 16 to place its drive within the general envelope of the upper frame. The auxiliary conveyor 20 extends primarily through the upper frame such that its discharging end extends in overlapping relationship above the receiving end of the main conveyor 14. However, the auxiliary conveyor 20 also extends slightly beyond the back of the upper frame to provide a receiving end accessible to other equipment feeding it. Material is received by the auxiliary conveyor 20 through a hopper 40 supported on the rear of the conveyor frame 63.

Figure 4:
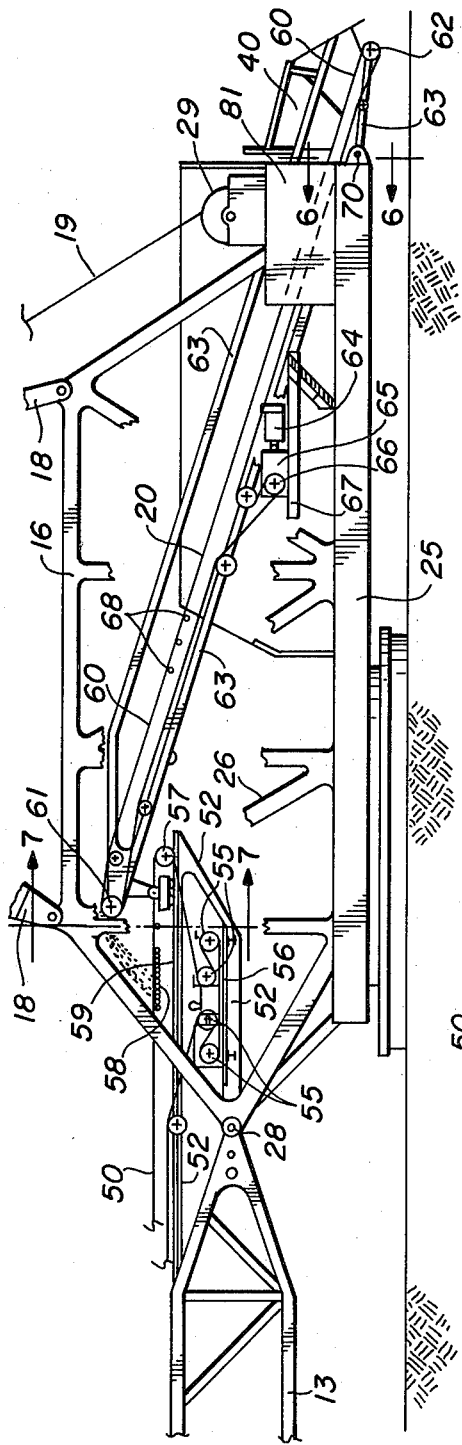
FIG. 4 is an enlarged side elevation of a portion of the machine of FIGS. 1-3 showing the cooperative relationship between the associated ends of the main and auxiliary conveyors.
Figure 6:
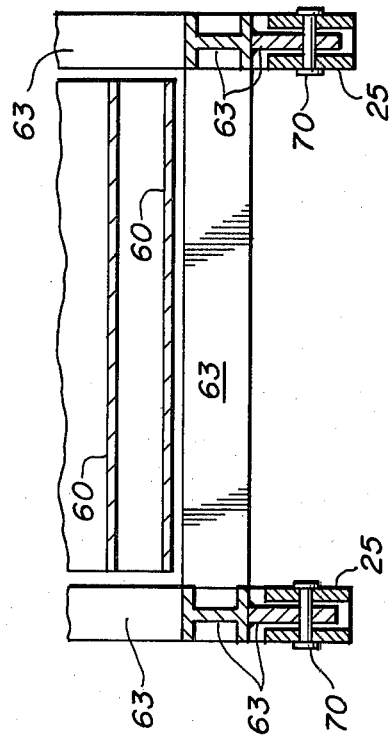
FIG. 6 is A cross-sectional view taken generally along the lines 6—6 in FIG. 4.
Figure 7:
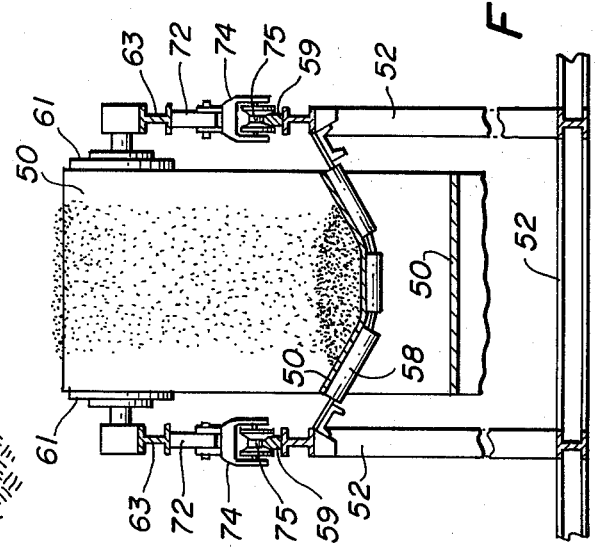
FIG. 7 is a cross-sectional view taken generally along the line 7—7 in FIG. 4.

Referring now to FIGS. 4–7, the cooperative arrangement between the main and auxiliary conveyors is discussed in more detail. The long belt 50 of the main conveyor 14 is carried around head and tail pulleys, 51 and 57 respectively, which are mounted on a frame 52 which is mounted on and supported by the boom 13. Dual drive assemblies comprising motors 53, speed reducers 54, and pulleys 55 are mounted on a platform 56 affixed to the conveyor frame 52 and drive the main conveyor belt 50. Intermediate the ends of the conveyor 14, the belt 50 is supported by troughing idlers 58. A higher concentration of idlers 58 exists in the area where payload material is received, as shown in FIG. 4, to absorb the impact of the falling material. A pair of rails 59 are affixed on opposite sides of the belt 50 to upper edges of the conveyor frame 52 near the end thereof.

The continuous belt 60 of auxiliary conveyor 20 is similarly carried around head and tail pulleys, 61 and 62 respectively, which are supported in a conveyor frame 63. A drive assembly comprising motor 64, speed reducer 65 and drive pulley 66 is mounted on a platform 67 carried by the conveyor frame 63 and drives the belt 60. Again the load carrying region of conveyor belt 60 is supported by troughing idlers typified by those indicated at 68.

The conveyor frame 63 for the auxiliary conveyor 20 is pivotably pinned to the base 25 of upper frame 16 at point 70 at the back end of the upper frame. The pivot connection is also near the rear or receiving end of conveyor 20.

Near the discharge end of auxiliary conveyor 20, a pair of legs 72 extend downwardly from the conveyor frame 63 on opposite sides of the belt 60. At the bottom of each leg 72 is a trolley assembly 74 including grooved rollers 75. The rollers 75 are aligned with and rollingly engage the rails 59 mounted on the frame 52 of the main conveyor 14.

With the arrangement of main conveyor 14 and auxiliary conveyor 20 just described the cross-pit conveyor 10 is provided a good deal of flexibility while maintaining a constant smooth transfer of payload material between the conveyors even if the position of the main conveyor changes. Referring for convenience to FIG. 4, it can be seen that even though the rear end of the main conveyor 14 extends into the imaginary envelope of the upper frame 16, it is free to move up and down as the boom angle is lowered or raised by the hoist machinery. Further, because the discharge end of the auxiliary conveyor 20 is floatingly supported through the legs 72 and trolleys 74 on the frame 52 of the main conveyor, it will move up and down with the rear end of the main conveyor. As a result, the vertical drop between the belt 60 and the belt 50 remains essentially constant even when the hoist angle of the main conveyor is changed.

It is a further feature of the arrangement shown that because the auxiliary conveyor 20 is hinged to the upper frame 16 very near its receiving end, that end does not move much in proportion to the opposite up or down movements of its discharge end. Consequently, the receiving end of conveyor 20 and hopper 40 maintain a nearly constant elevation for cooperation with other associated equipment notwithstanding changes in the hoist angle of the main conveyor.

Finally, since the auxiliary conveyor 20 is driven independently of the main conveyor 14, its belt speed can be controlled to propel the payload material onto the main conveyor at or very near the surface speed of the endless belt 50.

The embodiments of the invention in which an exclusive property or privilege is claimed are defined as follows:

1. A cross-pit conveyor for transporting excavated soils from the working bench across the pit to the reclamation area in a strip mining operation, comprising:
   a base suitable for positioning on the working bench;
   a horizontally extending upper frame mounted on said base and swingable about said base in a generally horizontal plane;
   a vertically inclinable long main conveyor pivotably connected at one end to the front end of said frame and extending therefrom across the pit to a discharge end;
   means for raising and lowering the discharge end of said main conveyor to change the inclination of said main conveyor; and
   a vertically inclinable auxiliary conveyor longitudinally aligned with said main conveyor and pivotally connected near one end to the back end of said upper frame and extending forwardly through said frame to a discharge end cooperatively overlapping said connected one end of the main conveyor, said discharge end of the auxiliary conveyor resting for support on said main conveyor such that it will move up and down therewith as the inclination of said main conveyor changes to maintain a substantially constant drop distance for transferring excavated soils from said auxiliary conveyor onto said main conveyor.

2. A cross-pit conveyor for transferring excavated material across the pit of a stirp mine, comprising:
   a base suitable for positioning on the unexcavated side of the pit;
   an upper frame mounted on said base and horizontally swingable with respect thereto;
   a vertically inclinable long main conveyor pivotably connected proximate its inboard end to said upper frame and extending therefrom a distance sufficient to reach across said pit and terminating at an outboard discharge end suspended above the ground;
   means connected between the upper frame and said main conveyor for hoisting said outboard end to vary the angle of inclination of said main conveyor; and
   a vertically inclinable auxiliary conveyor longitudinally aligned with said main conveyor and pivotably connected near one end to the back end of said upper frame, said auxiliary conveyor having a receiving end extending in the opposite direction from said main conveyor and a discharge end overlapping and resting for support on the inboard end of said main conveyor such that the discharge end of the auxiliary conveyor moves up and down with the receiving end of said main conveyor in response to a change in the angle of inclination of said main conveyor to maintain a substantially constant drop distance for excavated material being transferred between said conveyors.

3. A cross-pit conveyor as recited in claim 2, wherein said auxiliary conveyor further includes at least one leg extending downwardly from proximate the discharge end of the conveyor and having a roller at its lower end in rolling contact with the receiving end of said main conveyor to support said discharge end of the auxiliary conveyor and maintain said substantially constant spaced relationship between the overlapping ends of said conveyors.

4. A cross-pit conveyor as recited in claim 3, wherein said main conveyor comprises an endless belt wrapped around head and tail pulleys and intermediate support rollers mounted on a frame, and wherein the roller of said downwardly extending leg rests on an upper surface of the frame of said main conveyor.

5. A cross-pit conveyor as recited in claim 4, wherein said auxiliary conveyor comprises an endless belt wrapped around head and tail pulleys and intermediate support rollers mounted on a frame and said downwardly extending leg is attached to said auxiliary conveyor frame.

6. A cross-pit conveyor as recited in claim 2, wherein the receiving end of said auxiliary conveyor extends outward from the upper frame beyond the pivotable connection to said upper frame and further includes a receiving hopper mounted on said outward extended portion.

7. A cross-pit conveyor as recited in claim 2, further comprising a boom pivotally connected at one end to said upper frame and extending outwardly therefrom wherein said main conveyor is supported on said boom.

8. A cross-pit conveyor as recited in claim 2, further comprising a gantry extending upward from said upper frame.

9. A cross-pit conveyor as recited in claim 8, wherein said hoist means comprises:
   a hoist drum mounted on said upper frame;
   drive means for rotating said drum mounted on said upper frame and connected to said drum;
   at least one wire rope wrappingly connected to said drum and passing over the upper end of said gantry and extending and connected to the outboard end of said main conveyor.

* * * * *